(12) United States Patent
Keller

(10) Patent No.: US 6,432,334 B1
(45) Date of Patent: Aug. 13, 2002

(54) EXTRACTION METHOD FOR A CASTING MOLD OR PRESS MOLD

(75) Inventor: Dieter Keller, Aschaffenburg (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/488,302

(22) Filed: Jan. 20, 2000

(30) Foreign Application Priority Data

Jan. 22, 1999 (DE) .......................................... 199 02 429

(51) Int. Cl.[7] .............................................. B29C 45/64
(52) U.S. Cl. .................. 264/40.5; 264/328.1; 264/334; 425/150; 425/441
(58) Field of Search ............... 264/40.1, 40.5, 264/328.1, 334; 425/150, 441

(56) References Cited

U.S. PATENT DOCUMENTS

| | | | | |
|---|---|---|---|---|
| 4,906,173 A | * | 3/1990 | Inaba et al. ............... | 425/450.1 |
| 5,135,700 A | * | 8/1992 | Williams et al. ............. | 264/145 |
| 5,736,079 A | * | 4/1998 | Kamiguchi et al. ......... | 264/334 |
| 5,838,571 A | * | 11/1998 | Lewis ........................ | 264/40.1 |
| 6,120,712 A | * | 9/2000 | Chase ........................ | 264/40.5 |
| 6,183,235 B1 | * | 2/2001 | Taniguchi et al. ........... | 425/139 |
| 6,238,202 B1 | * | 5/2001 | Joseph ....................... | 425/556 |

FOREIGN PATENT DOCUMENTS

| | | |
|---|---|---|
| EP | 0 135 959 | 4/1985 |
| JP | 02006114 | 1/1990 |
| JP | 07016898 | 1/1995 |

* cited by examiner

Primary Examiner—Jill L. Heitbrink
(74) Attorney, Agent, or Firm—David M. Thimmig; Mayer Brown Rowe & Maw

(57) ABSTRACT

In an extraction method for a casting mold with a plurality of mold parts which can be displaced by electric motors, the electric motors are activated as a function of values deposited in a memory. The values represent required values for the respective positions of the mold parts. By this means, molded parts with complicated shapes can be extracted, with particularly small structural requirements, from the casting mold.

12 Claims, 1 Drawing Sheet

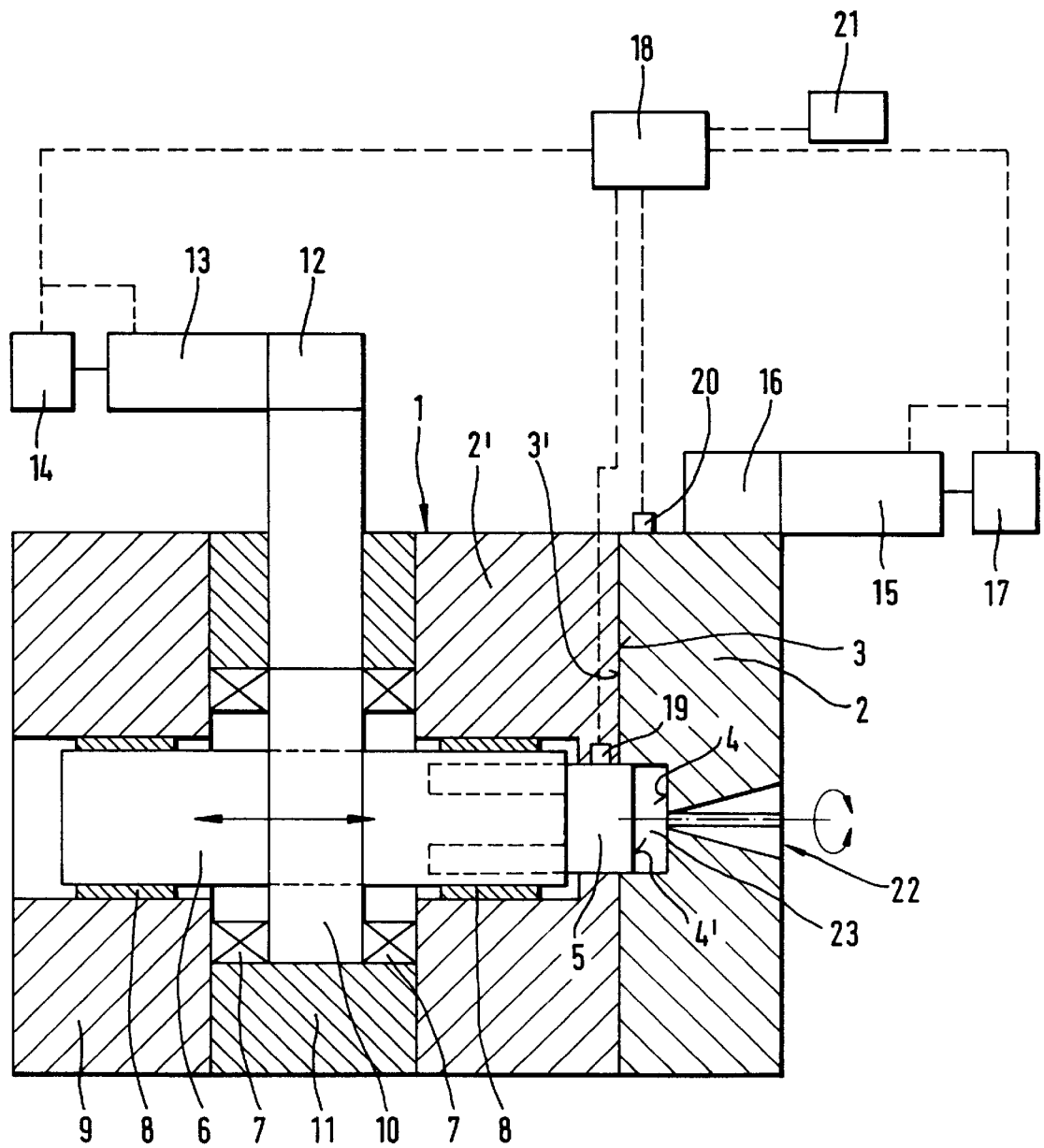

EXTRACTION METHOD FOR A CASTING MOLD OR PRESS MOLD

BACKGROUND OF THE INVENTION

The invention relates to an extraction method for a casting mold or press mold, in particular an injection stamping mold for plastic, in which a plurality of mold parts having a negative mold of the molded part to be manufactured are moved by at least two drives, which can be activated in dependence on one another.

Such methods with a plurality of drives are required where complicated molded parts are to be manufactured, and these are known from practice. In the known method, hydraulic cylinders employed for moving the mold parts are mechanically coupled to one another. In consequence, the motions of the mold parts have a specified relationship to one another so that, for example, one of the molded parts is rotated by a certain angle while the other is displaced linearly by a specified distance.

A disadvantageous feature of the known method is that it is very expensive to carry out because the mechanical coupling of the motions of the drives demands a very high level of structural complexity. Despite this complexity, damage to the molded part can occur due to parts of the molded part breaking. Incomparably more dangerous, however, is the case in which the molded part has an incipient fracture. Such damage cannot be recognized immediately and leads to the molded part only fracturing at a later date as a constituent part of a subassembly during the operation of the subassembly, so that the complete subassembly fails.

Renewed structural expenditure is necessary in each case in order to couple the motions of the drives for the manufacture of different molded parts. In addition, with the known method it is only possible to make an inaccurate allowance for shrinkage of the molded part. This often leads to damage to the molded part when it is extracted from the mold.

SUMMARY OF THE INVENTION

The invention is based on the problem of designing a method, of the type quoted at the beginning, in such a way that it can be matched to almost any given molded parts in the simplest possible manner and reliably avoids damage to the molded part during extraction from the mold.

In accordance with the invention, this problem is solved by a control device, for moving the mold parts, determining the position of the mold parts and comparing it with electronically stored motion curves and/or motion sequences and activating the drives as a function of the comparison.

By means of this design, the motions of the mold parts are determined by the control device in accordance with the motion curves. Mechanical coupling of the drives is therefore not necessary. Apart from the new calculation, therefore, no further expenditure is necessary when a new molded part has to be manufactured. The shrinkage of the molded part when it cools in the mold can, for example, be determined using experience values. The values from the motion curves can subsequently be compared with the experience values. The danger of damage to the molded part during its extraction from the mold is kept particularly small by means of the invention. In consequence, it is very simple to carry out the method according to the invention. The structural requirements for carrying out the method are particularly small due to the employment of the control device. By means of the invention, vane wheels of peripheral-duct pumps provided with a large number of undercuts and generated by the injection stamping process can be extracted from the mold without damaging the guide vanes.

The method according to the invention can be used at particularly low cost where the motion curves and/or the motion sequences are taken from an electronic memory.

The method according to the invention can be applied to almost any given design of molded parts if the motion curves and/or the motion sequences are calculated by a simulation computer to correspond with the molded part to be manufactured. By this means, a mold provided for carrying out the method according to the invention can be easily reprogrammed after the mold parts have been exchanged.

In accordance with an advantageous development of the invention, the molded parts can be moved with particular accuracy if the control device controls electric motors connected to the mold parts. By this means, the inaccuracy in the movement of the mold parts caused by leakage, for example, due to a hydraulic installation, is avoided.

Another advantageous development of the invention contributes to the further increase in the accuracy of the motion of the mold parts, using the track curves provided, if the control device supplies a series of step pulses to the electric motors for the stepwise motion of the mold parts.

The structural complexity for the control device and the memory can be kept particularly small, in accordance with another advantageous development of the invention, if the motion of the mold parts is measured in steps and if the control device converts the motion curves into target points for the electric motors. The motions of the mold parts and the sequence in time of the motions can be very simply fixed in this way.

The danger of destruction of the molded part to be manufactured can be kept particularly small if, in accordance with another advantageous development of the invention, the control device records an unintended contact between the mold parts and the molded part and at least switches off the drive causing the contact. The recording of the unintended contact with the molded part can, for example, take place by means of regular monitoring of the electric current taken by the electric motors. As an alternative to this, sensors, which determine the power expended for the motion of the mold parts, can be arranged in the drives.

The invention permits numerous embodiments. One of them is represented in the drawing and is described below for further clarification of the basic principle.

BRIEF DESCRIPTION OF THE DRAWING

FIG. 1 shows an appliance for the injection stamping of a molded part composed of plastic.

DETAILED DESCRIPTION OF THE PREFERRED EMBODIMENT

The appliance for injection stamping has a mold 1 with two plates 2, 2'. A negative mold 4 of the molded part to be manufactured is machined into one of the plates 2 at mutually opposite ends of the plates 3, 3'. The plate 2 has a nozzle 22 for introducing liquefied plastic into a cavity 23 provided for the molded part to be manufactured. A mold insert 5, into which a second negative mold 4' is machined on its end facing toward the opposite plate 2, is located in the other plate 2'. The mold insert 5 and the plate 2 opposite to the mold insert 5 are therefore respectively configured as mold parts and their negative molds 4, 4' form the boundaries of the cavity 23 for the molded part to be manufactured. The cavity 23 is somewhat larger than the molded part to be manufactured in order to compensate for any shrinkage of the material.

The molded part can, for example, be a vane wheel for a fuel pump configured as a peripheral duct. Such a vane wheel is characterized by a very small size (a few centimeters) and has a ring of vane chambers at one of its ends at least. The vane chambers are formed by guide vanes arranged obliquely relative to the ends. The vane wheel must therefore be extracted from the mold 1 by a rotation and simultaneous withdrawal.

The mold insert 5 is connected to a threaded spindle 6 of a screw-thread drive 7 at its end facing away from the negative mold 4'. The threaded spindle 6 is supported, so that it can move freely, by means of anti-friction guideways 8 on the plate 2' and a plate 9. A spindle nut 10 driving the threaded spindle 6 is rotatably arranged in a further plate 11 of the mold 1. The spindle nut 10 is driven, via a gear 12, by an electric motor 13 whose rotational speed, direction of rotation and electric current consumption are recorded by a measuring device 14. One of the plates 2 can be twisted relative to the other plate 2' by an electric motor 15 with a gear 16. The electric motor 15 is likewise connected to a measuring device 17 for recording its rotational speed, direction of rotation and electric current consumption. The measuring devices 14, 17 and the electric motors 13, 15 are connected to a common control device 18. The motions of the plate 2, which is configured as a mold part, and the mold insert 5 are respectively recorded by sensors 19, 20 and supplied to the control device 18. In addition, the control device 18 has a connection to a memory 21.

The control device 18 compares the values from the measuring devices 14, 17 and the sensors 19, 20 with values deposited in the memory 21. The values deposited in the memory 21 correspond to calculated required values of motion curves and motion sequences, within which the plate 2, which is configured as a mold part, and the mold insert 5 have to move. As an alternative to this, the values can also be generated by a simulation computer. In the mold for manufacturing vane wheels for a fuel pump configured as a peripheral duct, the sensors 19, 20 preferably record the motions of the mold parts in steps of between 0.001 and 0.01 mm. In the case of a deviation between the values of the sensors 19, 20 and the required values, the control device 18 corrects matters by corresponding signals to the electric motors 13, 15. After the plate 2, which is configured as a mold part, has been rotated out of the mold, the plates 2, 2' can be pulled apart. The molded part generated can, subsequently, be simply taken by hand from the mold insert 5. If, during the extraction from the mold, one of the measuring devices 14, 17 records an abrupt increase in the electric current consumption of the electric motors 13, 15, the control device 18 switches off the electric motors 13, 15. This prevents damage to the molded part manufactured.

What is claimed is:

1. A method of moving mold parts apart to permit removal of a plastic molded part from an injection molding machine, wherein the injection molding machine comprises a plurality of mold parts having a negative mold of a portion of the molded part to be manufactured, at least two screw-thread drives which can be activated in dependence on one another to move the mold parts and a control device for activating the drives to move the mold parts, the method comprising determining within the control device the position of the mold parts, comparing the position of the mold parts with electronically stored motion curves and/or motion sequences for the mold parts, and activating the drives as a function of the comparison of the position of the mold parts to the electronically stored motion curves and/or motion sequences to move the mold parts.

2. The method as claimed in claim 1, wherein the motion curves and/or the motion sequences are taken from an electronic memory.

3. The method as claimed in claim 1, wherein the motion curves and/or the motion sequences are calculated by a simulation computer to correspond with the molded part to be manufactured.

4. The method as claimed in claim 2, wherein the motion curves and/or the motion sequences are calculated by a simulation computer to correspond with the molded part to be manufactured.

5. The method as claimed in claim 1, wherein the control device controls electric motors connected to the mold parts.

6. The method as claimed in claim 4, wherein the control device controls electric motors connected to the mold parts.

7. The method as claimed in claim 5, where in the control device supplies a series of step pulses to the electric motors for stepwise motion of the mold parts.

8. The method as claimed in claim 6, wherein the control device supplies a series of step pulses to the electric motors for the stepwise motion of the mold parts.

9. The method as claimed in claim 5, where in the motion of the mold parts is measured in steps and wherein the control device converts the motion curves into target points for the electric motors.

10. The method as claimed in claim 8, wherein the motion of the mold parts is measured in steps and wherein the control device converts the motion curves into target points for the electric motors.

11. The method as claimed in claim 1, wherein the control device records an unintended contact between the mold parts and the molded part and switches off at least the drive causing the contact.

12. The method as claimed in claim 10, wherein the control device records an unintended contact between the mold parts and the molded part and switches off at least the drive causing the contact.

* * * * *